(12) United States Patent
Maslin et al.

(10) Patent No.: US 8,112,936 B1
(45) Date of Patent: Feb. 14, 2012

(54) CONTAINER-BASED PLANT HUSBANDRY APPARATUS AND CONTROLLED HORTICULTURAL ENVIRONMENT FOR USING SAME

(76) Inventors: Andy Eugene Maslin, Norfolk, NY (US); Brooks Alan Washburn, Potsdam, NY (US)

( * ) Notice: Subject to any disclaimer, the term of this patent is extended or adjusted under 35 U.S.C. 154(b) by 553 days.

(21) Appl. No.: 11/283,425

(22) Filed: Nov. 18, 2005

(51) Int. Cl.
 *A01G 9/00* (2006.01)

(52) U.S. Cl. .......................................... 47/59 R; 47/79

(58) Field of Classification Search .................. 47/79
 See application file for complete search history.

(56) References Cited

U.S. PATENT DOCUMENTS

| | | | | |
|---|---|---|---|---|
| 4,083,147 | A | * | 4/1978 | Garrick ............................. 47/80 |
| 4,160,342 | A | * | 7/1979 | Dryer ................................ 47/80 |
| 4,216,623 | A | * | 8/1980 | Silver ............................... 47/80 |
| 4,337,594 | A | * | 7/1982 | Hanacek et al. ................. 47/1.1 |
| 5,209,015 | A | * | 5/1993 | De Filippi ........................ 47/79 |
| 5,299,384 | A | | 4/1994 | Andrews |
| 5,383,943 | A | * | 1/1995 | Ogawa et al. ................. 47/66.7 |
| 5,983,561 | A | * | 11/1999 | Behrens ............................ 47/56 |
| 6,247,269 | B1 | | 6/2001 | Valiquette |
| 6,279,265 | B1 | | 8/2001 | Scannell, Jr. |
| 7,040,055 | B2 | * | 5/2006 | Nielsen ............................ 47/80 |

* cited by examiner

*Primary Examiner* — Frank T Palo
(74) *Attorney, Agent, or Firm* — Mark Levy; Hinman, Howard & Kattell, LLP; David L. Banner

(57) ABSTRACT

A container-based plant husbandry apparatus and a horticultural environment designed to optimize growth of plants therein. A liquid-tight container is filled to a first, predetermined height with a first media that, while providing support to an upper layer, is substantially liquid saturated. A second layer of growing media is physically placed upon and supported by the first media. Consequently, a wet zone and a dry zone are defined and established. The wet zone never encroaches the dry zone. An irrigation system adds water and/or nutrients. A controlled horticultural environment specifically designed for use with the containers is provided. The environment optimizes all environmental factors such as temperature, humidity, and light cycles in a controlled, sterile environment where pests, molds, fungus, and other hindrances to maximal plant growth may be effectively controlled if not eliminated.

29 Claims, 5 Drawing Sheets

CONTAINER-BASED PLANT HUSBANDRY APPARATUS AND CONTROLLED HORTICULTURAL ENVIRONMENT FOR USING SAME

FIELD OF THE INVENTION

The present invention pertains to horticultural systems and, more particularly, to a containerized plant growing system and a controlled horticultural environment for use therewith.

BACKGROUND OF THE INVENTION

Agriculture and, more especially, horticulture pertains to the science and art of growing fruits, vegetables, flowers, or ornamental plants. A large portion of the world's food supply comes from the endeavors of those engaged in horticulture. However, many factors are forcing changes in the methods used by farmers and others engaged in horticulture to produce edible plants. In many areas of the world, land is rapidly being diverted from agricultural purposes to other uses as exemplified by the urbanization of the planet. In some predominantly agricultural areas (e.g., the central valley of California in the United States) water is becoming scarce. Global warming is changing the location and method for growing certain crops. Changes in pests, including the emergence of resistant strains of pests, further stresses the agricultural system. Soil in certain areas has become depleted due to improper crop management over a long period. Acid rain caused by environmental pollution threatens still other crops in some parts of the world. The net result is that farmers using traditional methods have become increasingly ineffective in producing sufficient, cost effective harvests of many crops.

Some of the aforementioned problems have been dealt with. For example, in the central valley of California, an extensive water distribution infrastructure has been built to provide irrigation to crops being grown there. However, the changing environment threatens the very source of the distributed water. Tougher environmental pollution laws are eventually expected to reduce acid rain and the effects of other similar problems in areas progressive enough to recognize the threat of such pollution.

To solve some of these problems, attempts have been made to change the method of growing plants. In the field of container horticulture, different systems have been developed to provide an integrated approach to plant growth. These systems and methods include the use of hydroculture, hydroponics, artificial growing media, natural potting soil, and others known to those of skill in the horticultural arts.

Hydroculture systems immerse the entire root mass of a plant in stagnant nutrient water. While some plants are able to adapt to such conditions, many cannot.

Hydroponic systems also place the entire root mass of a plant in liquid, but the liquid is typically flowing nutrient water and the system utilizes a pump irrigation system. Many hydroponic systems supply nutrient-bearing water to the plants' roots only intermittently. Again, while some plants thrive in hydroponic environments, many do not. From a commercial point of view, hydroponics is limited to a relatively small percentage of edible plants.

Artificial growing media are known to be viable alternatives to conventional soil. Artificial growing media are particularly useful in growing plants, (e.g., orchids and other epiphyte plants) which have evolved their root system primarily for anchoring purposes in media other than soil. Artificial growing media includes mixtures of bark, peat moss, Spanish moss, sphagnum moss, fertilizer, vermiculite, etc.

Systems of containers using natural soil are known and used as they have proven themselves able to sustain the life of most plants, at least over a predetermined period. Several improvements for such natural soil containers have been suggested and, in some cases, implemented. For example, self-watering devices such as wicks or other bottom reservoirs have been suggested.

While container growing systems of the prior art may provide the roots with direct contact with soil particles and microorganisms, the water reservoir is generally not large enough or available enough for the growing needs of all plants.

Another fundamental limitation of prior art container growing systems relates to the fact that the roots of some plants cultivated in these containers become cramped, typically inside a compact ball of soil. Roots cannot expand outside of the ball of soil without being damaged as typically they escape only through drainage holes or other similar orifices in the container itself. Growing roots that reach the bottom of such plant containers tend to grow in a spiral pattern. Such growth patterns have been shown to waste growth resources of the plant. The roots, therefore, become engaged in a vicious cycle of unnecessary growth in order to find the necessary space for water seeking and uptake. This provokes the suffocation of root tissue, the complete arrest of growth by the plant, and the start of dormancy. Persons familiar with the art of plant husbandry recognize the symptoms of a "root bound" plant. They know that it eventually becomes time to transplant the plant into a larger container (e.g., pot). Left root bound, many plants lose their leaves and, eventually, die.

DISCUSSION OF THE RELATED ART

U.S. Pat. No. 5,299,384 for SELF-DRAINING PLANTER, issued Apr. 5, 1994 to Dean D. Andrews discloses a planting container adapted to prevent over filling with water. A drain having a filter element to retain soil is placed in the side of the container. Excessive liquid placed in the container flows through the filer and out the drain.

U.S. Pat. No. 6,279,265 for PLANT POT WITH WATER LEVEL CONTROL DEVICE, issued Aug. 28, 2001 provides plant growing container (i.e., a pot) having a liquid level indicator as well as a manually actuated drainage mechanism. An automatic mechanism for adding water may also be provided. Electronic signaling of water level is disclosed.

U.S. Pat. No. 6,247,269 for SYSTEM FOR PLANT GROWING, issued Jun. 19, 2001 to Marc Andre Valiquette provides a container system with inserts containing supporting soil, the inserts designed to isolate plant roots from a liquid and gaseous medium.

None of these references individually, or in any combination are seen to teach or suggest the inventive container-based plant husbandry system of the invention.

SUMMARY OF THE INVENTION

In accordance with the present invention there is provided a container-based plant husbandry apparatus and a horticultural environment designed to optimize growth of plants therein. A liquid-tight container is filled to a first, predetermined height with a first media that, while providing support to an upper layer, is substantially liquid saturated. A second layer of growing media is physically placed upon and supported by the first media. Consequently, a wet zone and a dry zone are defined and established. A drain may be provided to ensure that the wet zone never encroaches the dry zone. An irrigation system may be provided to add water and/or nutrients, typically from above the dry zone to simulate natural rainfall on the plants grown in the container. The irrigation system may be controlled in response to a measured parameter in either the wet zone or the dry zone.

The plant husbandry system in accordance with the invention provides the best features of hydroponic or hydroculture approaches to plant husbandry with those of traditional "dirt" framing, both container-based or open-field methods. The inventive system overcomes all of the disadvantages of prior art container systems and provides a highly efficient method of growing plants.

The novel system of the invention combines the unique growing container with a controlled horticultural environment specifically designed for use with the inventive containers. The environment optimizes all environmental factors such as temperature, humidity, carbon dioxides (COO levels, and light cycles in a controlled, sterile environment where pests, molds, fungus, and other hindrances to maximal plant growth may be effectively controlled if not eliminated. In addition, potentially detrimental weather elements such as heavy rain, wind, hail, ice, etc. may be eliminated. Further, when properly constructed, the controlled horticultural environment may be constructed to be substantially vermin proof.

It is, therefore, an object of the invention to provide a containerized plant husbandry system.

It is another object of the invention to provide a containerized plant husbandry system wherein containers have a horizontally stratified lower wet zone and an upper dry zone.

It is an additional object of the invention to provide a controlled environment adapted for use with the containerized plant husbandry system.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

The present invention provides a comprehensive plant husbandry system consisting of individual containers and a controlled environment in which plant growth may be optimized.

Figure 1:
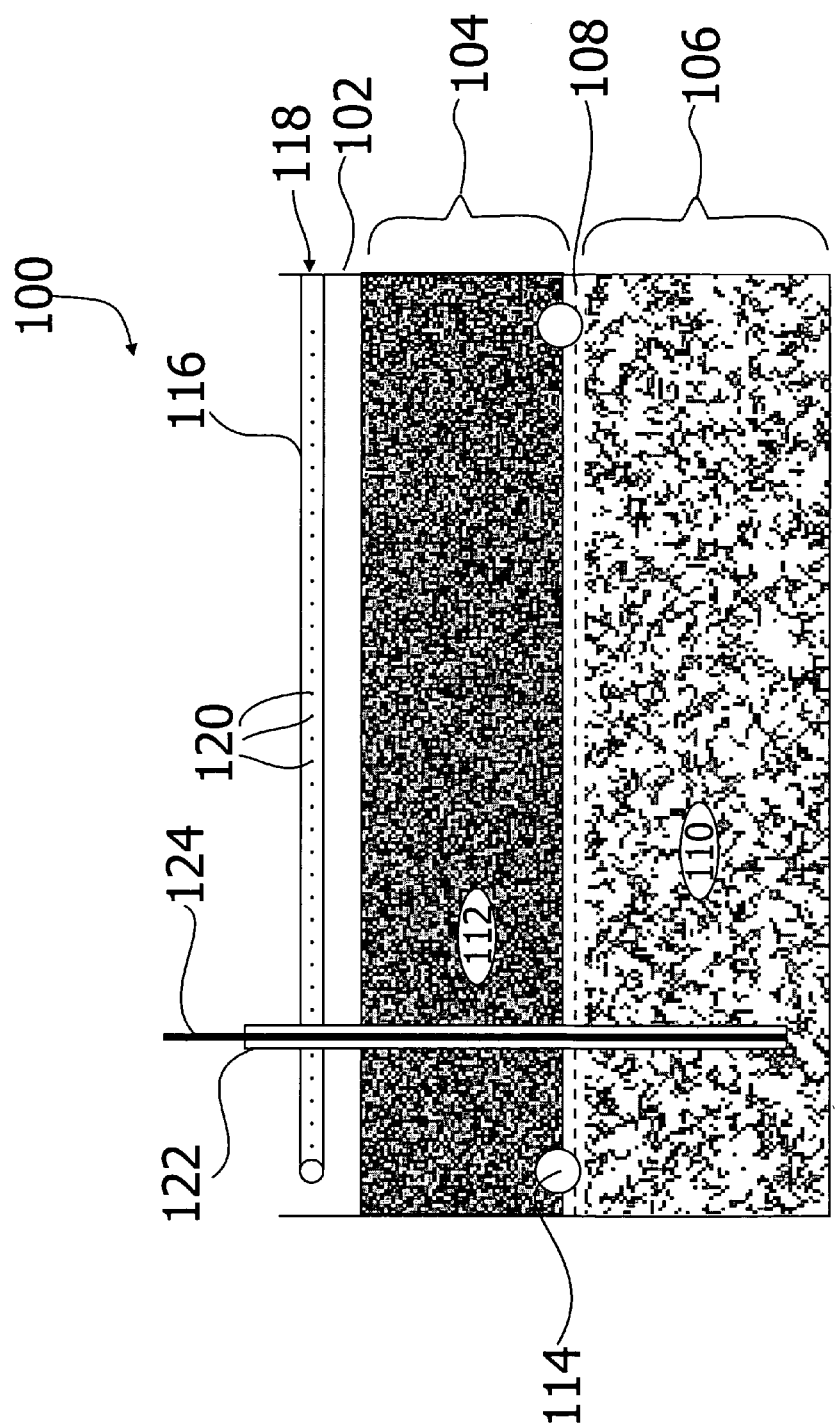
FIGS. 1, 1*a* and 1*b* are schematic, side, cross-sectional and top views, respectively, of a container in accordance with the invention.
Figure 1A:
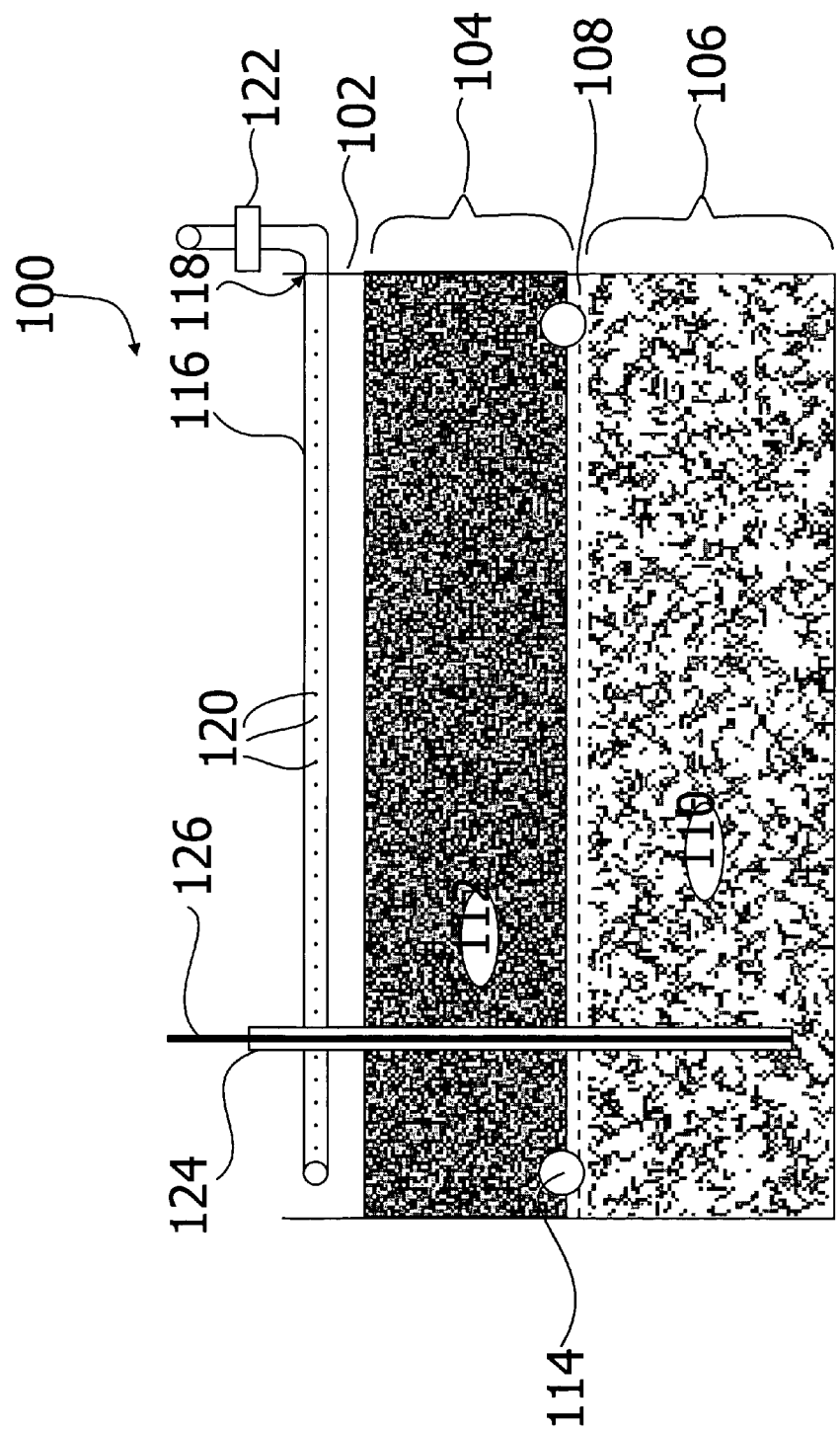
Figure 1B:
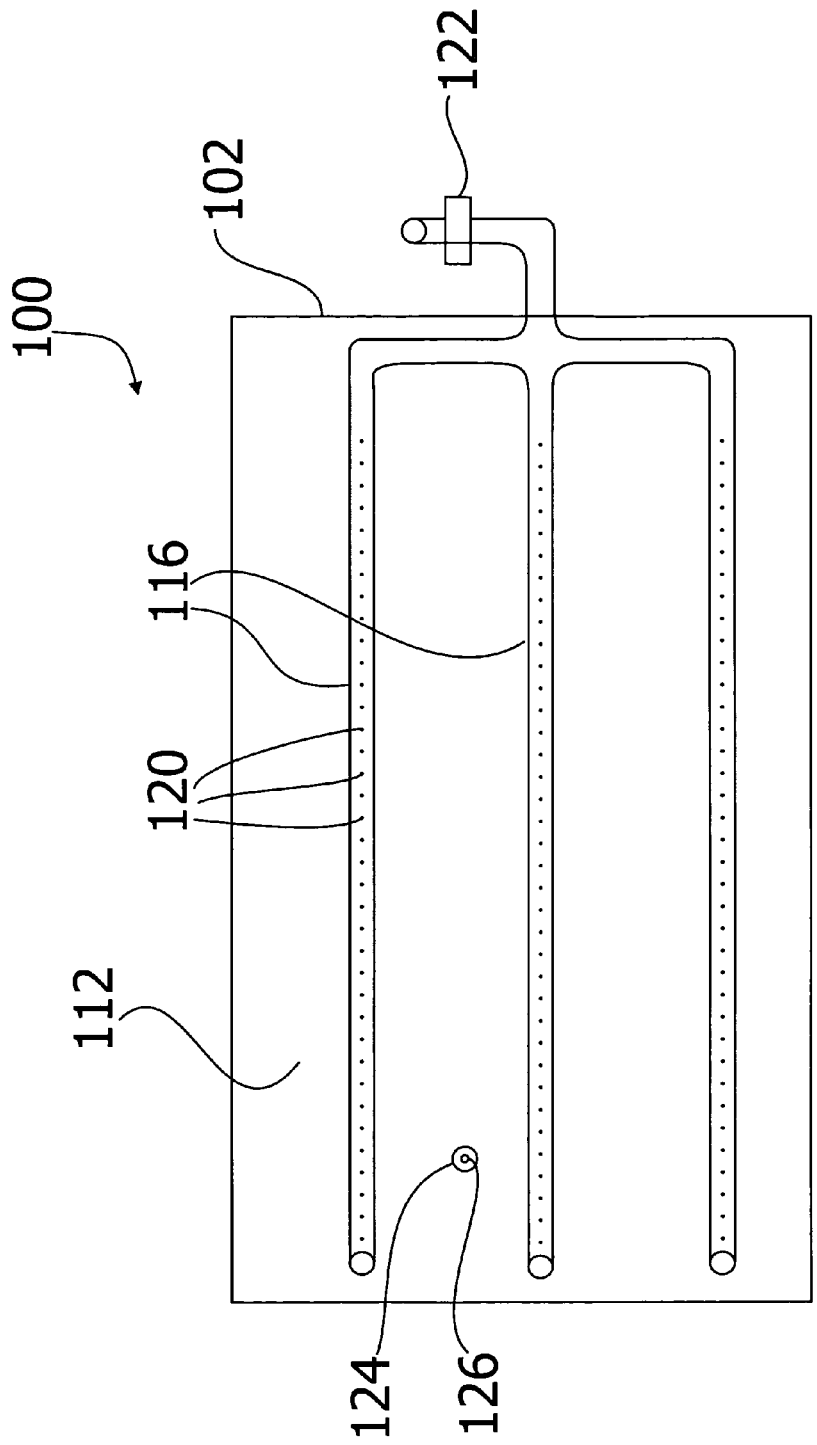

Referring first to FIGS. 1, 1*a* and 1*b*, there are shown schematic, side elevational and top plan views, respectively of a container in accordance with the present invention, generally at reference number 100. A liquid-tight container 102 is provided. Container 102 may be a small, portable, self-contained container suitable for placement on a porch, patio etc. In other embodiments discussed in detail hereinbelow, container 102 is representative of a large, elongated structure suitable for commercial production of plants.

Regardless of the size of container 102, a first growing media 110 is disposed in a substantially uniform layer along the bottom of container 102 thereby defining a lower, wet zone 106. First growing media 110 is selected to allow saturation by (i.e., commingling with) a liquid, typically an aqueous solution containing at least nutrients. First growing media 110 is selected to provide sufficient structural support for a layer of a second growing media 112 formed directly thereabove. The layer of second growing media 112 also has a substantially uniform thickness and is disposed parallel to the layer of first growing medial 110. Second growing media 112 defines an upper, dry zone 104. First growing media 110 may be as simple as hay or straw or may be another material such as washed rock or gravel, pine bark nuggets, aquarium rock, leaves, and the like. First growing media may be either organic, inorganic, biodegradable, or non-biodegradable. It will be recognized that may other material may be used as first growing media. Consequently, the invention is not limited to the particular material chosen for purposes of disclosure. Rather, the invention covers any and all materials suitable for forming a lower wet zone 106. Second growing media 112 is typically sterile dirt or another similar growing media such as lava rock or perlite known to those of skill in the art. Since it will be recognized that other suitable material may be used as growing media 112, the invention is not limited to the materials chosen for purposes of disclosure but covers any and all suitable materials.

A demarcation between the lower, wet zone 106 and the upper, dry zone 104 is shown schematically by line 108. By properly configuring the lower and upper layers (i.e., first growing media 110 and second growing media 112, respectively,) a boundary 108 therebetween remains intact during operation of the inventive growing system.

One or more drains 114 are provided to prevent the liquid, not specifically identified, in lower, wet zone 106 from encroaching or leaching into upper, dry zone 104. Drains 114 may be equipped with a filter, not shown, to prevent escape of particulate matter from the lower, wet zone 106 through drains 114. The filter may be a simple screen filter or a more elaborate structure. Such filters are know to those of skill in the art and are not further described herein. Consequently, the invention is not considered to any particular filter structure. In addition, the quantity, size, and placement of drains 114 may be varied to meet a particular operating requirement and, likewise, the invention is not considered limited to a particular size, placement, or quantity of drains 114. Rather, the invention includes any and all drain configurations. In alternate embodiments, level sensitive pumps or other such mechanisms may be used to maintain a liquid in lower wet zone 106 at a desired level.

One or more irrigation tubes or pipes 116 are placed over the top of upper, dry region 104. A plurality of holes 120 is schematically representative of one or more orifices in irrigation pipe 116. Liquid, not shown, generally water bearing nutrients or other chemical treatments is supplied to irrigation tube 116 through an end 118.

A valve 122 is interposed between irrigation pipe 116 and a source of liquid, not shown. The valve 122 may be manually actuated or, in alternate embodiments, automatically actuated. Manually and automatically actuated valves 122 are known to those of skill in the art. The actual configuration of valve 122 forms no part of the instant invention. It will be recognized that while irrigation pipe is schematically shown disposed over upper, dry region 104, many other placements are possible. Liquid, for example, may be directly infused into upper, dry region 106. In still other embodiments, liquid may be fed directly to lower, wet region 104. In yet other embodiments, liquid may be supplied to more than one of the aforementioned regions 104, 106, either simultaneously or sequentially.

A hollow tube 124, communicative with lower, wet zone 106 is provided. A dipstick 126 disposed in tube 124 may be used to assess actual liquid level in lower, dry region 106. It will be recognized that other liquid level assessment devices may be used. For example, a sight glass, not shown, on a side or end of container 102 may be used for the purpose. In still other embodiments, a flotation device or other electrical or electronic transducer may be used to assess the actual liquid level in lower, wet region 106. Consequently, the invention is not considered limited to any particular liquid level measurement apparatus or technique.

In operation, plants, not shown, are placed in upper, dry region 104 with the roots, not shown, downwardly directed. Because sterile soil is used for second media 112, potential problems with weed and insects are precluded. The roots will seek the moisture that is in lower, wet zone 106 and grow theretowards. Once the roots reach the uppermost boundary of lower, wet zone 106, they have access to unlimited nutrients. Unlike hydroculture and hydroponics, a plant is sufficiently supported in the second growing media 112 in the upper, dry region 104. The plant's roots, however, enjoy all the benefits of hydroculture or hydroponics. That is, nutrients are continuously available. Unlike the possibilities of hydroculture or hydroponics, each plant species may extend roots into the lower, wet zone 106 only to the extent that the plant needs nourishment or water. The system becomes self-regulating and provides the best of all possible worlds from a horticultural prospective.

In a sun-exposed environment, heat is trapped during the day by the lower, wet zone 106 and released through a cold night, the liquid in lower, wet zone 106 acting as a moderator.

One or more containers 102 may be successfully employed by an individual for personal use (i.e., growing produce for a small family, etc.). The low cost and virtually automatic, foolproof operation suits the needs of busy individuals who still wish to enjoy growing their own produce. One implementation of the inventive system is commercially provided as DirtPonics™.

In addition to the novel, bi-level, container system 100 described hereinabove, the system of the invention may be extended to large, commercial facilities. An immediate benefit that will be recognized is that in a large facility, many factors may be controlled to optimize growth of a particular crop. For purposes of disclosure, a commercial facility is described.

Figure 2A:
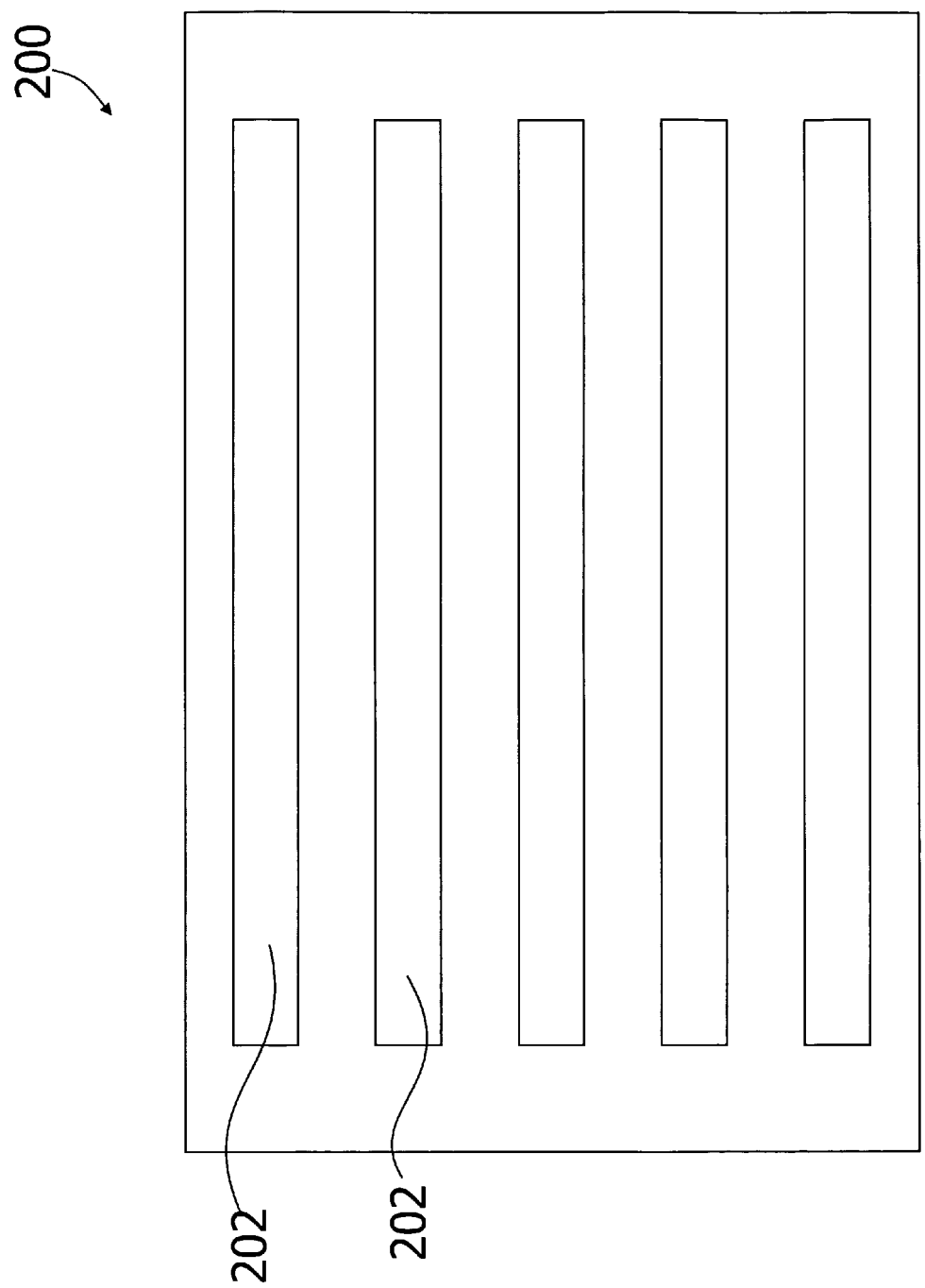
FIGS. 2*a* and 2*b* are schematic, top plan and side, cross-sectional views, respectively, of a growing area of a building dedicated to commercial horticultural production in accordance of the invention.
Figure 2B:
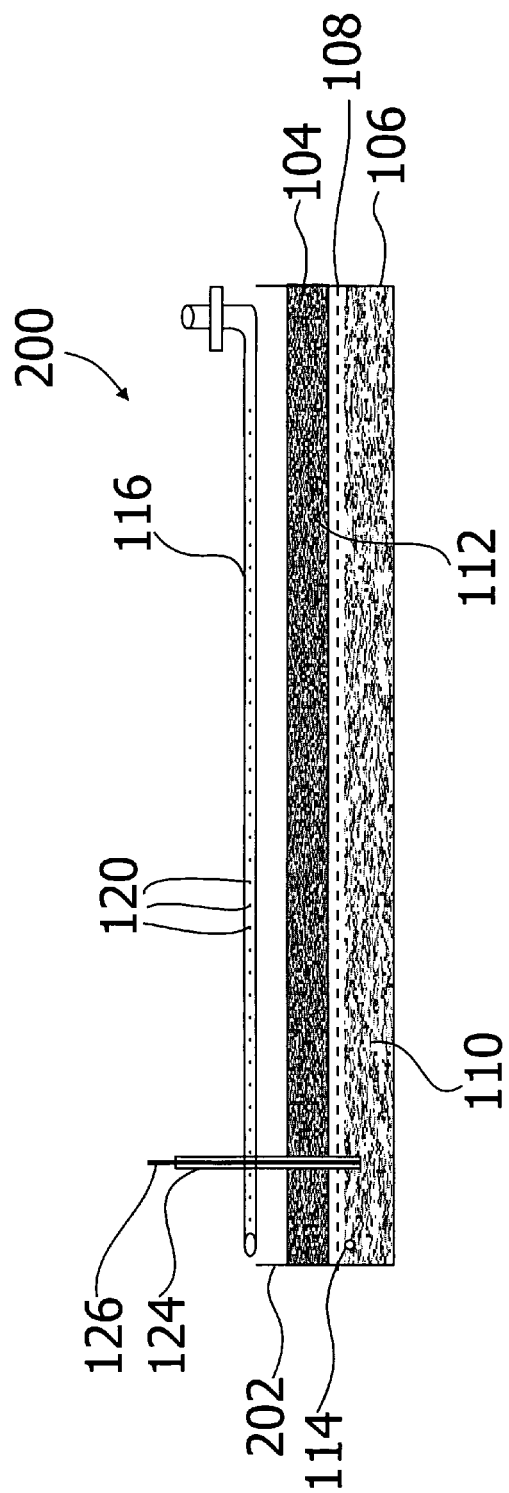

Referring now to FIGS. 2a and 2b, there are shown top plan, and side elevational views, respectively of a growing area 200 of a large building, not shown, dedicated to commercial horticultural production using the novel Dirtponics method. Rather than containers 102 (FIG. 1), there are provided long, possibly raised, frames or bins 202. Each bin 202 has the same layered configuration of growing media described hereinabove. A first growing medial layer 110, saturated with a liquid supports, a second growing medial layer 112, thereby defining a lower, wet zone 106 and an upper, dry zone 104, respectively. Tanks, pumps, and mixing equipment, not shown, are provided to supply nutrient-bearing water to each of the bins 202 through a plurality of irrigation tubes 116.

When housed in a building designed for the purpose of Dirtponics agricultural production, frames 202 may be optimally productive. Within a closed building, air temperature and humidity, and $CO_2$ levels may be controlled to optimum values to maximize plant growth and/or productivity. Further, air within the Dirtponics building may be filtered to eliminate contaminants. Contaminants may be of a generally undesirable nature or, contaminants specific to a particular crop may be eliminated using specialized filters. While natural light may be used, better growth control is provided when all natural light is substantially excluded from the growing space of building. Natural light is unpredictable, generally uncontrollable, and subject to variations caused by seasons or weather. In place of natural light, artificial, spectrum-controlled light may be provided to simulate day/night cycles. Such cycles may be optimized for a particular crop and varied throughout the life of that particular crop. When required, lighting fixtures may be mounted on overhead tracks, not shown, and moved therealong, either manually or automatically, to simulate the passing of the sun across the sky.

Research has shown that certain plants respond favorably to certain sounds such as particular styles of music. By creating a substantially sound-isolated environment, optimal sound may be provided as desired to further maximize crop production.

Insects may optionally be introduced into the closed environment as required. For example, certain species of aphids, ladybugs, and the like have been shown to provide benefits to certain crops. Bees may be introduced to provide pollination when required to optimize crop production. A beehive itself may be placed within the closed building environment.

Plants react favorable to the controlled environment created by the novel DirtPonics system as both their root systems and foliage are provided with optimized environments. The controlled atmosphere enhance foliage growth while the novel nutrient supply system provided by the two-layer approach optimizes the eating and breathing of the plants. By optimizing both environments and eliminating any possibility of shock, optimized crop production is obtained. This happens because none of the plants resources are dedicated to survival issues but rather may be utilized for growth and production of the crop for which the particular plant is cultivated. The inventive system provides the growth speed generally associated with hydroponic growing systems while maintaining the beneficial and expected flavor and nutrient contents of traditional soil-grown crops.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for growing a plant, comprising:
  a) a liquid-tight container having a bottom surface and a plurality of upstanding walls extending substantially perpendicularly therefrom;
  b) a first growing media forming a first layer having a first thickness disposed adjacent and substantially parallel to said bottom surface and defining a lower, wet zone;
  c) a second growing media forming a second layer having a second thickness disposed adjacent an upper surface of and substantially parallel to said first layer and defining an upper, dry zone;
  d) means for regulating the level of a liquid in said liquid-tight container;
  e) a liquid commingled with said first growing media and having a depth substantially equal to said first thickness;
  whereby said second layer comprising said second growing media is supported upon said first layer comprising said first growing media and said liquid commingled therewith.

2. The apparatus for growing a plant as recited in claim 1, wherein each of said first layer and said second layer comprises substantially rectangular parallelepipeds.

3. The apparatus for growing a plant as recited in claim 1, wherein said first thickness is substantially equal to said second thickness.

4. The apparatus for growing a plant as recited in claim 1, wherein said means for regulating the level of a liquid comprises a drain disposed in at least one of said upstanding walls.

5. The apparatus for growing a plant as recited in claim 1, further comprising:
   f) means for measuring a depth of said liquid.

6. The apparatus for growing a plant as recited in claim 5, wherein said means for measuring a depth of said liquid comprises at least one of: a dip stick, a sight glass, and a liquid level sensor.

7. The apparatus for growing a plant as recited in claim 1, wherein said liquid comprises an aqueous nutrient solution.

8. The apparatus for growing a plant as recited in claim 1, further comprising:
   f) means for irrigating proximate said liquid-tight container.

9. The apparatus for growing a plant as recited in claim 8, wherein said means for irrigating comprises a perforated pipe disposed in at least one of the locations: above an upper surface of said second layer, within and substantially parallel to said second layer, and within and substantially parallel to said first layer.

10. The apparatus for growing a plant as recited in claim 1, wherein liquid-tight container comprises a portable, self-contained container.

11. The apparatus for growing a plant as recited in claim 1, wherein said first growing media comprises at least one material from the list: hay, straw, washed rock, pine bark nuggets, aquarium rock, leaves, other organic media, and other inorganic media.

12. The apparatus for growing a plant as recited in claim 1, wherein said second growing media comprises at least one material from the group: sterilized dirt, perlite, and lava rock.

13. A system for optimizing commercial agricultural production, comprising:
   a) a greenhouse having at least one controlled environmental variable;
   b) a liquid-tight container disposed within said enclosed space, said container comprising a first growing media forming a first layer comprising at least one of the group: hay, straw, washed rock, pine bark nuggets, aquarium rocks, leaves, and the like, having a first thickness defining a lower, wet zone, a second growing media forming a second layer comprising at least one from the group: sterile dirt, lava rock, and perlite, having a second thickness disposed adjacent an upper surface of and substantially parallel to said first layer and defining an upper, dry zone, and a liquid commingled with said first growing media and having a depth substantially equal to said first thickness, whereby said second layer comprising said second growing media is supported upon said first layer comprising said first growing media and said liquid commingled therewith;
   c) means for regulating a level of said liquid within said container; and
   d) means for providing liquid to said container.

14. The system for optimizing commercial agricultural production as recited in claim 13, wherein said at least one environmental variable is selected from the list: air temperature, humidity, air contamination, light level, light spectral shape, lightness/darkness cycle, light position, sound level, and sound content.

15. The system for optimizing commercial agricultural production as recited in claim 13, wherein said greenhouse is sealed against external contaminants.

16. The system for optimizing commercial agricultural production as recited in claim 13, wherein each of said first layer and said second layer comprises substantially rectangular parallelepipeds.

17. The system for optimizing commercial agricultural production as recited in claim 13 wherein said first thickness is substantially equal to said second thickness.

18. The system for optimizing commercial agricultural production as recited in claim 13, wherein said means for regulating the level of a liquid comprises a drain disposed in said liquid-tight container.

19. The system for optimizing commercial agricultural production as recited in claim 13, further comprising:
   e) means for measuring a depth of said liquid.

20. The system for optimizing commercial agricultural production as recited in claim 19, wherein said means for measuring a depth of said liquid comprises at least one of: a dip stick, a sight glass, and a liquid level sensor.

21. The system for optimizing commercial agricultural production as recited in claim 13, wherein said liquid comprises an aqueous nutrient solution.

22. The system for optimizing commercial agricultural production as recited in claim 13, wherein said means for providing a liquid to said container comprises a perforated pipe disposed in at least one of the locations: above an upper surface of said second layer, and within and substantially parallel to said second layer.

23. A method of growing a plant, the steps comprising:
   a) providing a liquid-tight container comprising a first growing media forming a first layer having a first thickness defining a lower, wet zone, a second growing media forming a second layer having a second thickness disposed adjacent an upper surface of and substantially parallel to said first layer and defining an upper, dry zone, and a liquid commingled with said first growing media and having a depth substantially equal to said first thickness, whereby said second layer comprising said second growing media is supported upon said first layer comprising said first growing media and said liquid commingled therewith;
   b) planting at least one of a seed, a seedling, and a plant in at least one of said first growing media and said second growing media; and
   c) providing and regulating a supply of an aqueous, nutrient-bearing solution to said container and regulating a level thereof in said lower, wet zone.

24. The method of growing a plant as recited in claim 23, the steps further comprising:
   d) controlling at least one environmental variable selected from the list: air temperature, humidity, light level, light spectral shape, lightness/darkness cycle, light position, sound level, and sound content in a space proximate said container.

25. The method of growing a plant as recited in claim 23, wherein said providing step (a) comprises providing said first growing media and said second growing media such that said first thickness is substantially equal to said second thickness.

26. The method of growing a plant as recited in claim 23, wherein said providing and regulating step (c) comprises using a drain disposed in said liquid-tight container.

27. The method of growing a plant as recited in claim 23, the steps further comprising:
   d) providing means for measuring a depth of said liquid.

28. The method of growing a plant as recited in claim 27, wherein said providing step (d) comprises providing at least one of: a dip stick, a sight glass, and a liquid level sensor.

29. The method of growing a plant as recited in claim 23, wherein said providing and regulating a supply of an aqueous, nutrient-bearing solution step (c) comprises supplying said aqueous, nutrient-bearing solution through a perforated pipe disposed in at least one of the locations: above an upper surface of said second layer, within and substantially parallel to said second layer, and within and substantially parallel to said first layer.

\* \* \* \* \*